United States Patent
Clark

[19]

[11] Patent Number: 6,039,170
[45] Date of Patent: Mar. 21, 2000

[54] ENCLOSED MOVABLE TRIPPER BELT CONVEYOR

[76] Inventor: Philip G. Clark, 46256 266th St., Hartford, S. Dak. 57033

[21] Appl. No.: 09/025,562

[22] Filed: Feb. 18, 1998

[51] Int. Cl.[7] .................................................. B65G 37/00
[52] U.S. Cl. ............................................ 198/364; 198/812
[58] Field of Search ............................... 198/364, 370.01, 198/370.1, 370.03, 371.3, 371.2, 585, 588, 812, 860.3, 860.5

[56] References Cited

U.S. PATENT DOCUMENTS

| | | |
|---|---|---|
| 396,500 | 1/1889 | Macdonald . |
| 863,202 | 1/1907 | Moss . |
| 2,078,863 | 4/1937 | Lundbye . |
| 2,644,572 | 7/1953 | Mercier . |
| 2,644,574 | 7/1953 | Mercier . |
| 2,748,918 | 6/1956 | Mercier . |
| 2,760,622 | 8/1956 | Magee . |
| 2,818,966 | 1/1958 | Gill . |
| 3,286,818 | 11/1966 | Ross . |
| 3,522,876 | 8/1970 | Purdy ........................................ 198/364 |
| 3,567,048 | 3/1971 | Whitham . |
| 3,828,916 | 8/1974 | Patz . |
| 4,381,733 | 5/1983 | Patz et al. . |
| 4,714,151 | 12/1987 | Campbell et al. . |

FOREIGN PATENT DOCUMENTS

| | | | |
|---|---|---|---|
| 2600990 | 1/1988 | France | ................................. 198/364 |
| 1099222 | of 1968 | United Kingdom . | |

*Primary Examiner*—James R. Bidwell
*Attorney, Agent, or Firm*—Baker Botts, L.L.P.

[57] ABSTRACT

An enclosed movable tripper belt conveyor includes an elongated trunking having an endless conveyor belt carried by troughing idlers along an upper path leading from a tail pulley to a head pulley. The belt returns from the head pulley to the tail pulley in sliding contact with a floor of the trunking. A movable tripper unit includes a tripper that discharges the material being conveyed to a valve that is configured and arranged to selectively discharge the material to one side or the other of the movable tripper unit. A cover is received over the trunking and the movable tripper unit so as to form with the trunking an enclosure containing the belt, the tail pulley, the head pulley, all of the troughing idlers and the movable tripper unit.

21 Claims, 6 Drawing Sheets

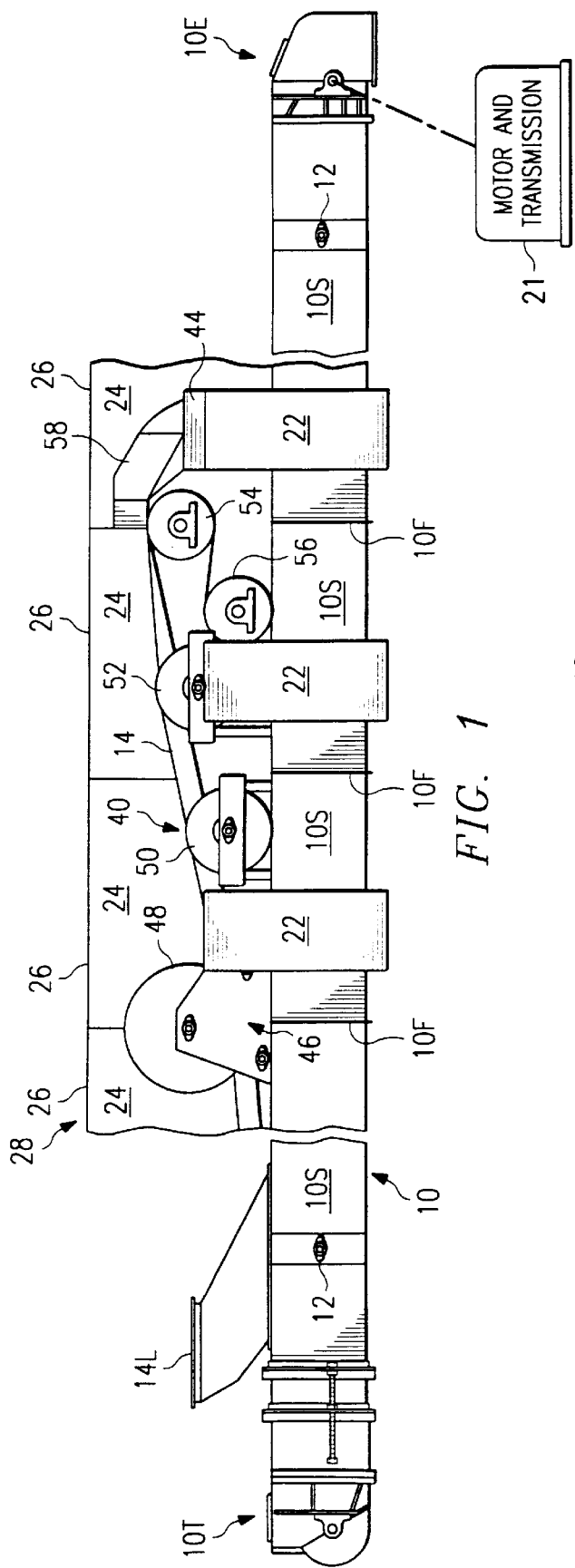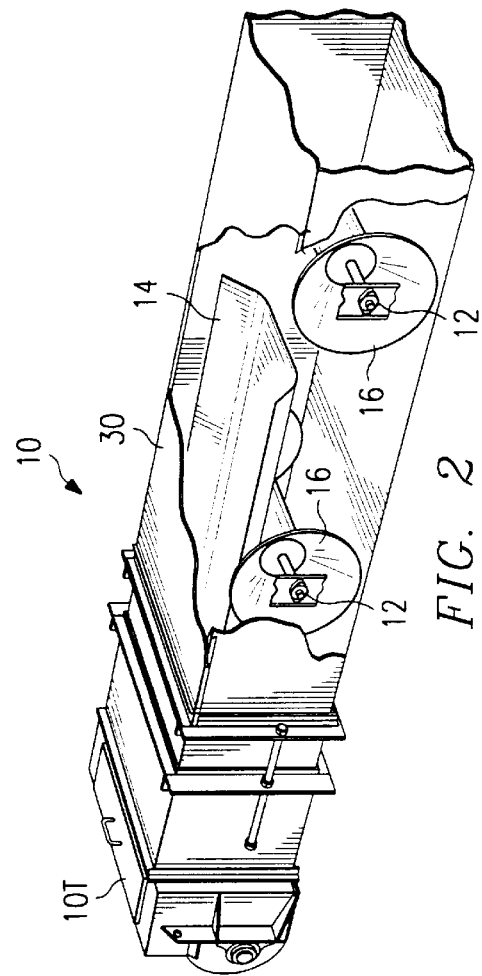

ENCLOSED MOVABLE TRIPPER BELT CONVEYOR

TECHNICAL FIELD OF THE INVENTION

The present invention relates generally to belt conveyors and, more particularly, to belt conveyors in which a movable tripper unit for delivering the material being conveyed to a selected one of several receiving locations along the path of an endless belt is completely enclosed at all times when material is being conveyed by the belt and delivered to a selected location.

BACKGROUND OF THE INVENTION

Hansen Manufacturing Corp. Of Sioux Falls, S. Dak., makes and sells enclosed belt conveyors under the trademark HI ROLLER™, in which the belt and the elements that support it are completely enclosed in a housing, which includes an elongated, U-shaped structure that is usually called the "trunking" and a cover over the open top of the trunking. The covered trunking provides a structural support for troughing idlers, the belt and the material being conveyed, protects the material being conveyed by keeping out foreign substances and, in an outside installation, rain and snow, and keeps dust and any fugitive material that falls from the belt from entering the environment. The previously known HI ROLLER™ conveyors, which are in widespread use for conveying various materials, especially grains, all provide delivery at the head end or at the head end and one or more intermediate stationary discharge units along the conveyor upstream from the head end.

It is common for a material that is being conveyed by a belt conveyor to be ultimately delivered to several locations, such as a group of storage bins or to different locations in a single storage bin. One form of belt conveyor that provides delivery to multiple locations is an open traveling tripper belt conveyor, a conveyor that is equipped with a traveling tripper that includes a tripper and a valve. It is also well-known to use an enclosed conveyor that discharges to a distributor, which, in turn, delivers the material to the several bins or locations in a single bin, or to incorporate one or more stationary tripper units in an enclosed conveyor, each of which discharges to a different point.

Like all open belt conveyors, open traveling tripper belt conveyors, even when installed under a cover for weather protection, allow dust and fugitive material to escape to the environment and require constant, costly cleanup. Previously known enclosed belt conveyors with fixed tripper units and enclosed belt conveyors delivering to distributors are costly to fabricate and install, although the cost is fully justifiable by almost completely eliminating escape of dust and fugitive material to the environment.

SUMMARY OF THE INVENTION

One object of the present invention is to provide a movable tripper belt conveyor in which the belt is fully enclosed along its delivery and return runs. A further object is to capture virtually all dust and spillage and return it to the tail end of the conveyor for reloading onto the belt. It is also an object of the invention to reduce the costs of operating a conveyor that delivers product selectively to selected destinations, especially cleanup and maintenance costs. Still another object is to eliminate the need for a distributor or multiple fixed trippers for delivery of material by an enclosed conveyor to multiple points, thereby reducing the investment costs required to provide delivery to multiple points.

The foregoing objects are attained, in accordance with the present invention, by a movable tripper belt conveyor that has an elongated trunking having a floor and side walls, a tail pulley mounted in the tail end, and a head pulley mounted in the head end. A plurality of longitudinally spaced-apart troughing idlers are mounted on the side walls of the trunking along the entire length thereof between the tail pulley and the head pulley and define an upper troughed path for an endless conveyor belt that is trained between the tail pulley and the head pulley. The belt returns from the head pulley to the tail pulley in sliding contact with the floor of the trunking. A movable tripper unit associated with a portion of the trunking includes a tripper that has a carriage supported for movement longitudinally along the trunking. Side members of the carriage located above and laterally on both sides of the upper path of the belt carry one or more troughing idlers and a pair of trough-forming discs upstream from the troughing idlers for leading the belt along an upward bend from the upper path along an inclined path to a discharge unit. The discharge unit has an upper bend pulley and a valve configured and arranged to receive material from the belt adjacent the upper bend pulley and discharge it selectively to one side or the other of the movable tripper unit. A lower bend pulley carried by the frame above the upper path and below the upper bend pulley leads the belt from the upper bend pulley back to the upper path. A cover received over the trunking is configured and arranged to form with the trunking an enclosure containing the belt, the tail pulley, the head pulley, all of the troughing idlers and the movable tripper unit.

The advantages of having the belt and the movable tripping unit completely enclosed by the trunking and a cover over the trunking are readily apparent to those skilled in the art. Foremost among them is keeping dust and fugitive material from entering the environment. The present invention greatly reduces the need for costly cleanup around the conveyor. In that regard, open traveling tripper conveyors often require that a worker be assigned full time to cleaning. An enclosed conveyor also keeps foreign materials from contaminating the material being conveyed. For example, when a facility has several conveyors that are used for loading or unloading various materials, it can be extremely important to keep airborne fugitive materials or dust from other conveyers or other equipment at the facility from mingling with a particular commodity being conveyed.

In some embodiments of the present invention, the cover may be an inverted U-shaped or box-shaped rigid trunking cover that is coextensive with at least the portion of the trunking along which the movable tripper unit travels, the trunking cover having a top wall and side walls, and the lower edges of side walls of the trunking cover being joined to the upper edges of the side walls of the trunking in sealed relation. The inverted U-shaped trunking cover may extend the full length of the conveyor. Alternatively, the cover for the trunking may include cover panels attached to the upper edges of the side walls of the trunking along at least a portion of the trunking between the tail end and the rearward-most end of the portion of the trunking along which the movable tripper unit travels. Preferably, the trunking cover has a plurality of delivery chutes attached to each of the side walls at each delivery position. The valve of the movable tripper unit may be a basket valve that is movable to communicate selectively with an inlet opening to the delivery chutes on either side of the movable tripper unit.

The tripper of the movable tripper unit may include a pair of spaced-apart discs engaging the upper surface of the belt at a location between the upper path and the discharge unit, each disc engaging a band of the belt proximate to a juncture between a medial portion and inclined side portions so as to maintain the side portions inclined with respect to the medial portion. Usually, the tripper will also have at least one troughing idler.

In other embodiments of the present invention, the movable tripper unit has side walls, the lower edge portions of which engage upper portions of the side walls of the trunking in sliding sealed relation, and the cover in at least the portion of the conveyor along which the movable tripper unit moves includes a flexible web, which is supported in sealed relation on the upper edges of the side walls of the trunking and is picked up and guided over the top of the movable tripper unit by guide rolls carried by the movable tripper unit. Preferably, the movable tripper unit has a rigid cover that travels with it and forms, along with the flexible web, the trunking cover for the delivery section of the conveyor. The movable tripper unit may have dual interlocked rack and pinion gates for discharge to chutes affixed to the side walls of the cover. The movable tripper unit may be supported for movement along the trunking in various ways, such as by rails extending longitudinally on the bottom of the movable tripper unit which roll along the troughing idlers or by rollers mounted on the sides of the frame of the movable tripper unit which run on the conveyor trunking or on rails located generally laterally and outside of the trunking. A discharge chute is attached to each side wall of the frame of the movable tripper unit and moves with the movable tripper unit among the delivery stations.

BRIEF DESCRIPTION OF THE DRAWINGS

For a more complete understanding of the present invention and additional preferred features, and the advantages thereof, reference may be made to the following written description of exemplary embodiments, taken in conjunction with the accompanying drawings, in which:

FIG. 1 is a side elevational view, which is generally schematic in form, of a first embodiment, portions being broken away and several sections of the trunking cover being removed to reveal the movable tripper unit;

FIG. 2 is a schematic pictorial view of a portion adjacent the tail end of the embodiment of FIG. 1;

DESCRIPTION OF THE EMBODIMENTS

Figure 3:
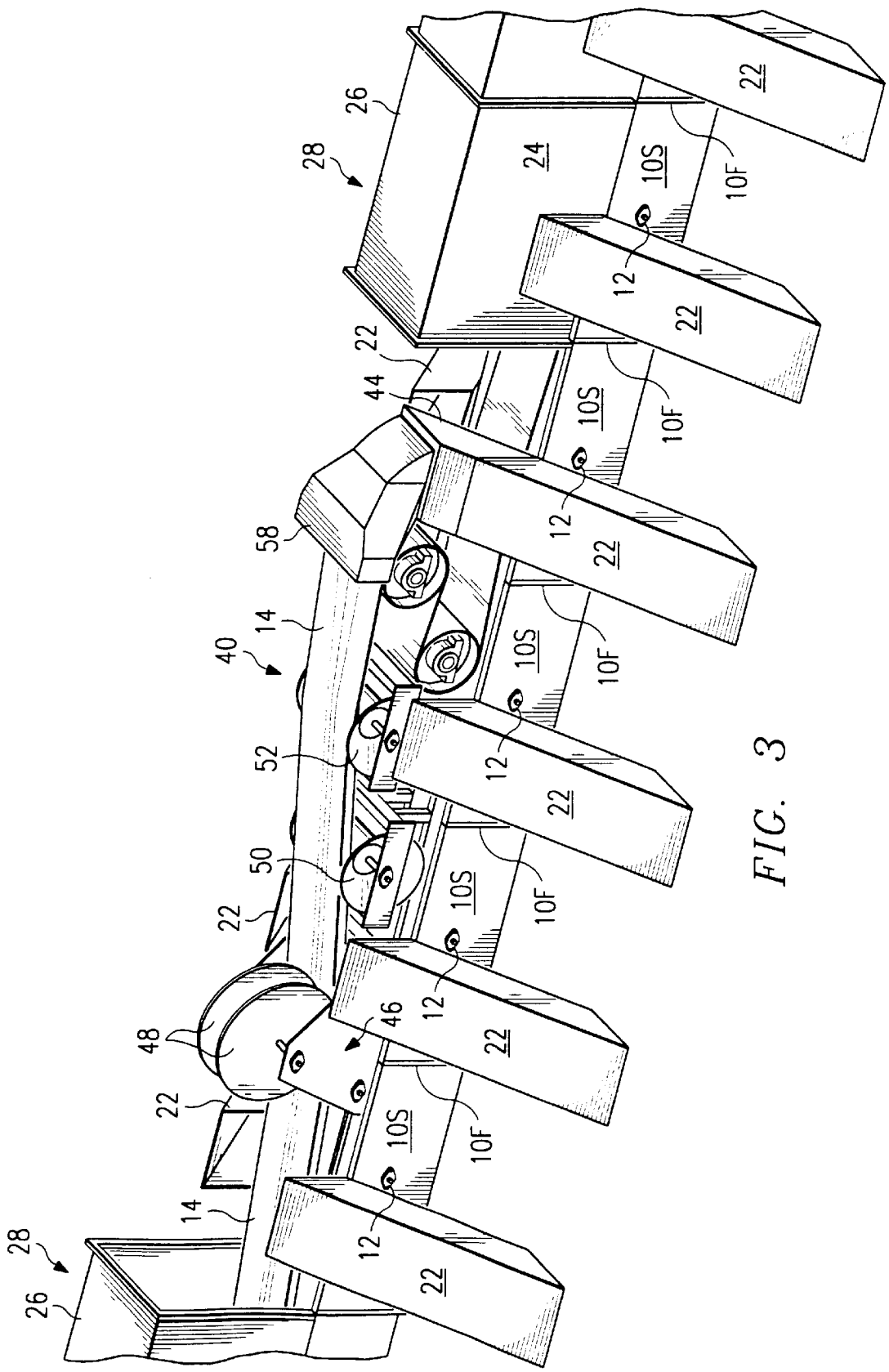
FIG. 3 is a schematic pictorial view of the discharge section of the first embodiment, some of the sections of the trunking cover being removed to reveal the movable tripper unit.
Figure 4:
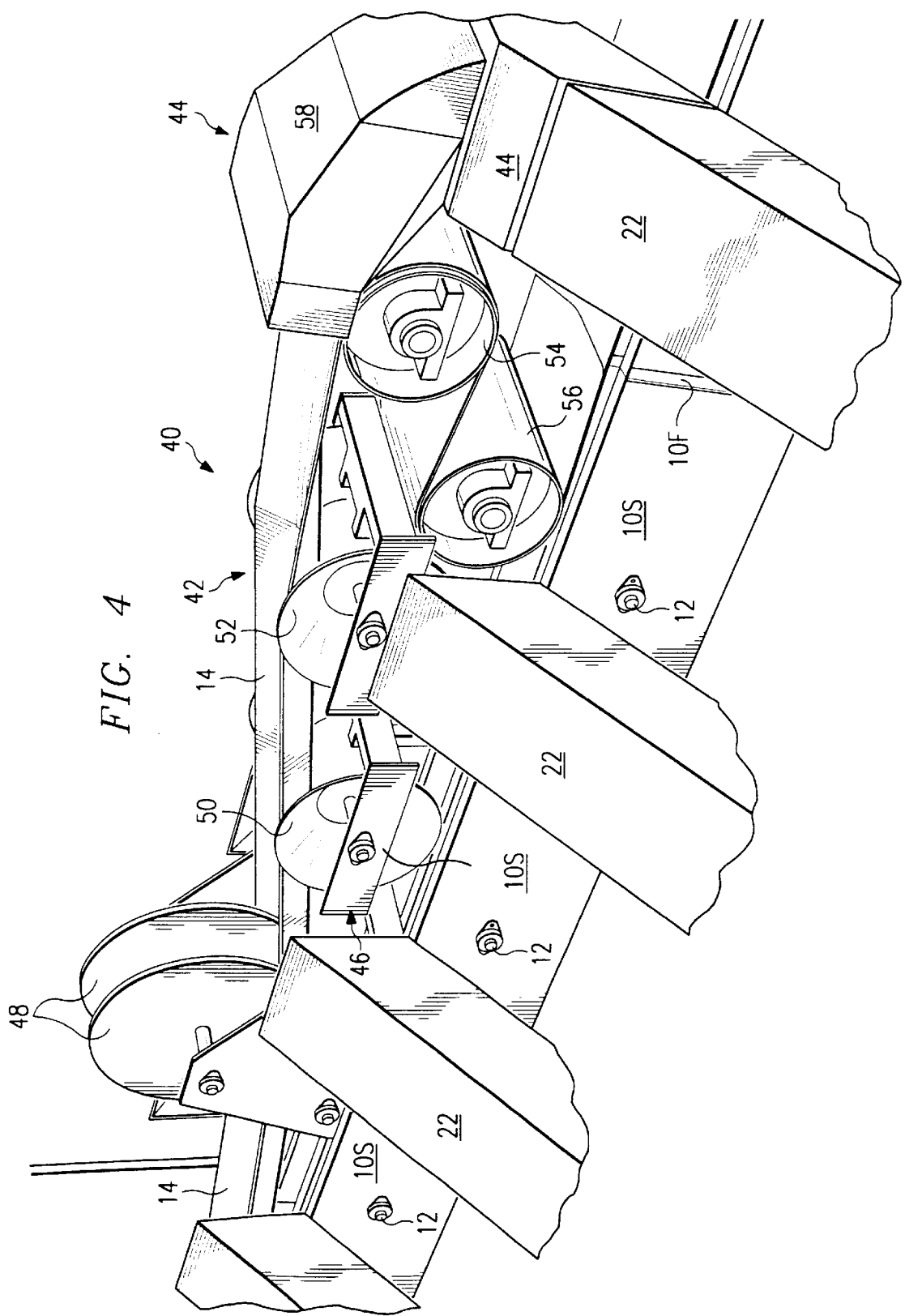
FIG. 4 is an enlargement of a portion of FIG. 1.
Figure 5:
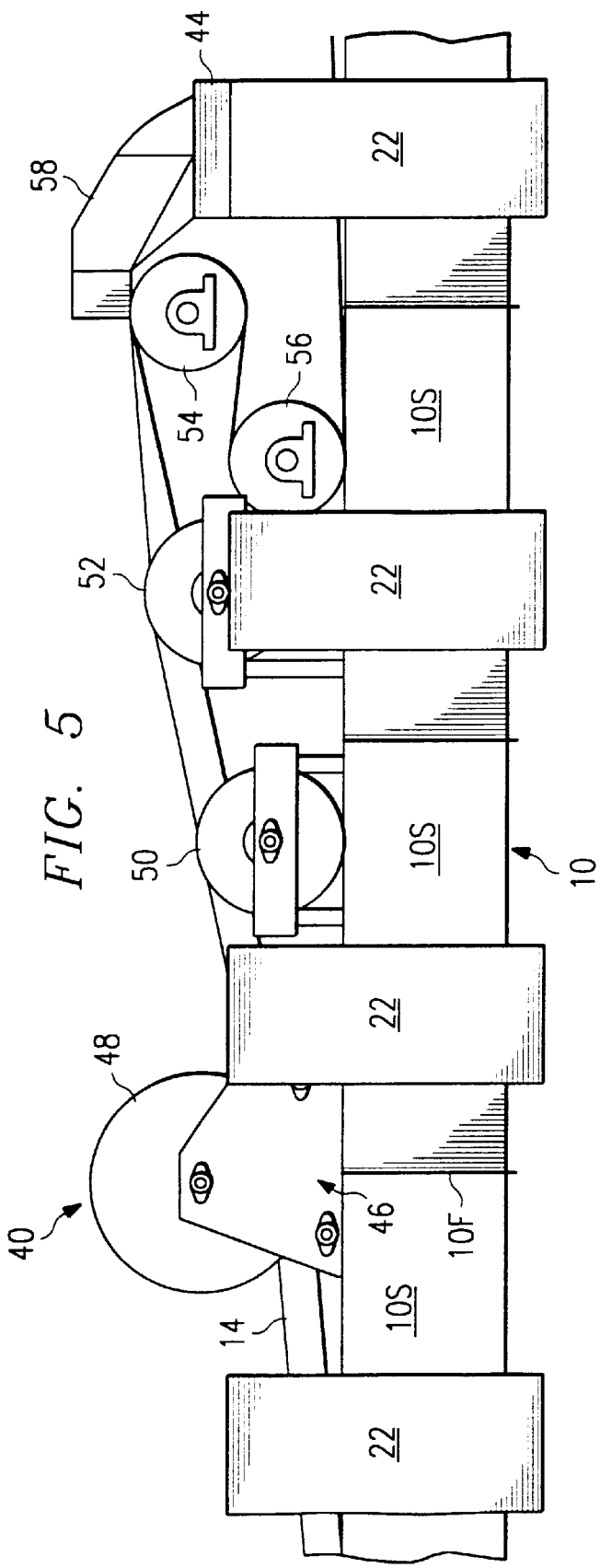
FIG. 5 is a generally schematic side elevational view of the movable tripper unit of the first embodiment with the near side wall of the trunking cover cut away.

An exemplary embodiment of the present invention and its advantages are best understood by referring to FIGS. 1 to 7 of the drawings, like numerals being used for like and corresponding parts of the various FIGURES. The teachings of the present specification and the drawings may be used to advantage in enclosed movable tripper belt conveyors of various configurations.

A movable tripper belt conveyor in which the present invention is useful, as embodied in the one shown in FIGS. 1 to 5, has an elongated trunking 10 that extends the entire length of the conveyor from a tail end 10T to head end 10E. The trunking 10 is a U-shaped support structure that is fabricated from steel sheet or plate and supports all components of the conveyor other than bearings for tail and head pulleys and a drive motor and transmission at the head end. The trunking 10 also forms the lower and side walls of an enclosure that protects the material being conveyed from the environment and the environment from the material. Ordinarily and as shown, the trunking of enclosed belt conveyors is of modular construction, consisting of rectangular sections 10S that are bolted together end to end along end flanges 10f. The trunking 10 is covered along the entire length of the conveyor.

The material to be conveyed is delivered through a belt loader 14L near the tail end 10T of the conveyor to an endless belt 14, which is supported along an upper delivery run of the belt within the trunking 10 by spool-like, spaced-apart troughing idlers 16, the shafts of which are supported by bearings 12 mounted outside of the side walls of the trunking. Other types of troughing idlers may be substituted for the spool-type shown in the drawings. U.S. patent application Ser. No. 09/025,563, entitled TROUGHING IDLERS FOR BELT CONVEYORS, and filed concurrently with the present application describes and shows troughing idlers that may be used to advantage in movable tripper conveyers according to the present invention. The troughing idlers are provided along the entire length of the conveyor.

A drive pulley (not shown) at the head end 10E, which is driven by a motor through a transmission 21, pulls the belt along the upper run and reverses the belt to the return run. The belt returns to the tail end by sliding along the floor of the trunking, which is lined with ultra high molecular weight polyethylene sheets. By sliding along the trunking floor along the return run, the belt sweeps dust and spillage back to the tail end, where it is reloaded onto the upper, delivery run by a reloader (not shown). The self-cleaning and reloading features provide considerable savings in operating costs, especially clean-up costs, and by reducing down time for cleaning. The closed system eliminates spillage and reduces the escape of dust to a negligible amount.

FIGS. 1 and 3 to 5 show part of the discharge region of a first embodiment of a conveyor, according to the present invention, which is a region located between and above several bins (or sections of one or more large bins). In order to enclose a movable tripper unit (described below) that rides along the top of the trunking 10, an inverted U-shaped trunking cover 28 fits over the top of the part of the trunking along which the movable tripper unit moves. The trunking cover 28 has side walls 24, which mate with the top edges of the trunking, and a top wall 26 and form with the trunking along the discharge section of the conveyor a dust-tight enclosure for the movable tripper unit. The trunking cover 28 may, as shown, be made up of sections joined end to end. Each of the bins or bin sections is served by an inclined chute 22. Each chute 22 is connected in sealed relation to the side wall 24 of the trunking cover 28. The conveyor may include a portion running from the tail end to the discharge section and a portion running from the discharge section to the head end, which portions may be covered by cover panels 30 attached to the top edges of the trunking 10. The trunking cover has, of course, end walls (not shown). The trunking, the cover panels 30 (if provided), and the trunking cover 28 thus form a fully enclosed housing for the belt, the troughing idlers, and the movable tripper unit.

The movable tripper unit 40 consists of a traveling tripper 42 (parts 46 to 58 described below) and a valve 44. A framework 46 of the tripper 42 extends from adjacent the disks 48 to beyond the valve 44. Parts of the framework are removed in the drawings to show the internal parts of the tripper and valve. The framework has rails (not shown) on its underside that ride on the troughing idlers 16, which do not support the belt along the tripper, the belt having been picked up from the troughing idlers 16 by the tripper 42, and are, therefore, available to support the tripper itself. The belt 14 passes under a pair of spaced part discs 48, which engage the upper surface of the belt along the junctures of the medial portion and the sloping sides and maintain the trough shape of the belt along a portion of the belt path between the point where it is picked up from the main upper run along the troughing idlers 16 and the first of two tripper troughing idlers 50 and 52, thus forming an up-bend in the belt 14. The belt runs from the second idler 52 to an upper bend pulley 54 and then to a lower bend pulley 56. The material being conveyed is delivered from the belt at the upper bend pulley 54 into a discharge duct 58, which feeds the material to the valve 44, which in the embodiment is a basket valve. The basket valve 44 is movable to provide left or right delivery to the chutes 22 on either side of the conveyor. The empty belt runs from the lower bend pulley 56 back to the main upper run to the head end 10E.

The movable tripper unit 40 is moved along the discharge section of the conveyor by an endless cable (not shown), the upper run of which is supported by pulleys attached to the top wall 26 of the trunking cover 28. The lower run is connected to the frame of the tripper 42. The movable tripper unit stops at any selected delivery station and discharges material to a selected right or left chute 22 at the selected station.

The trunking 10, the cover panels 30, the trunking cover 28 and the chutes 22 provide a completely enclosed material conveying path from the tail end to the head end of the conveyor, which prevents escape of dust and fugitive material to the environment and excludes environmental foreign materials from the conveyor. If desirable or necessary, cross-venting between bins through the chutes 22 and the covered trunking 10 can be prevented by providing top-pivoted, self-closing gates (not shown) on each chute. Each chute 22 may also have an explosion relief door downstream, with respect to the gate, from the trunking.

Figure 6:
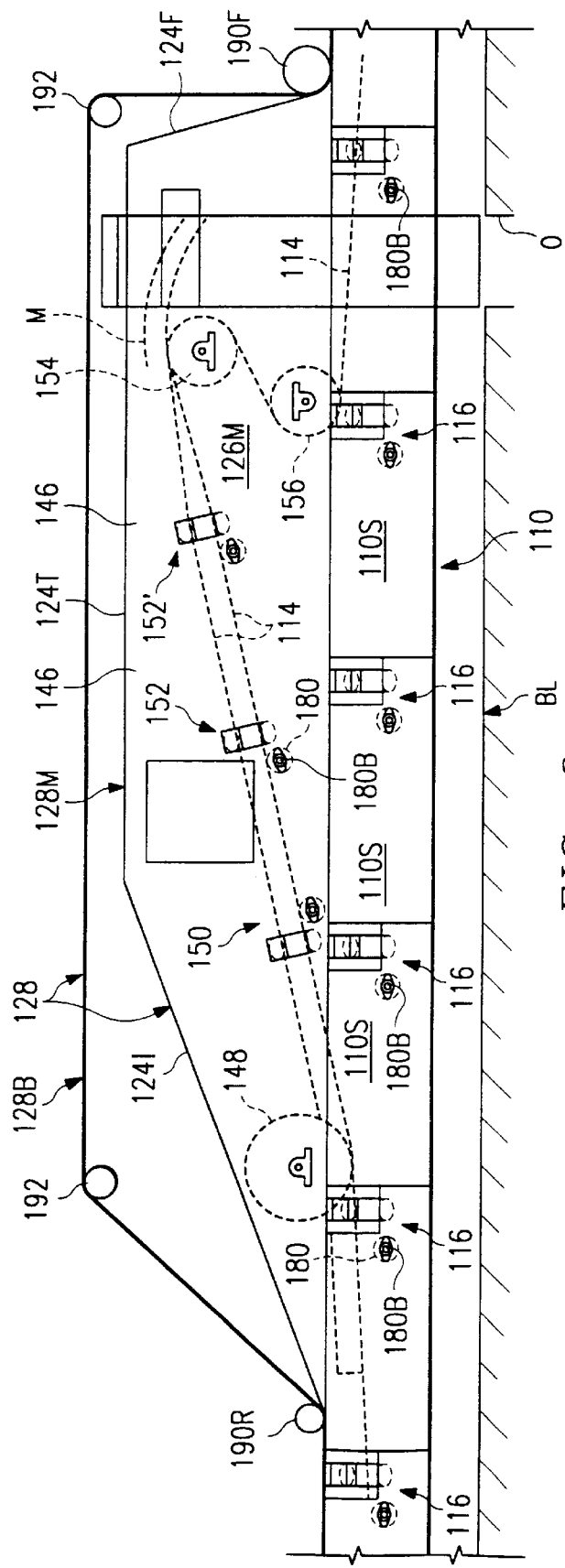
FIG. 6 is a generally schematic side elevational view of a second embodiment of the present invention.
Figure 7:
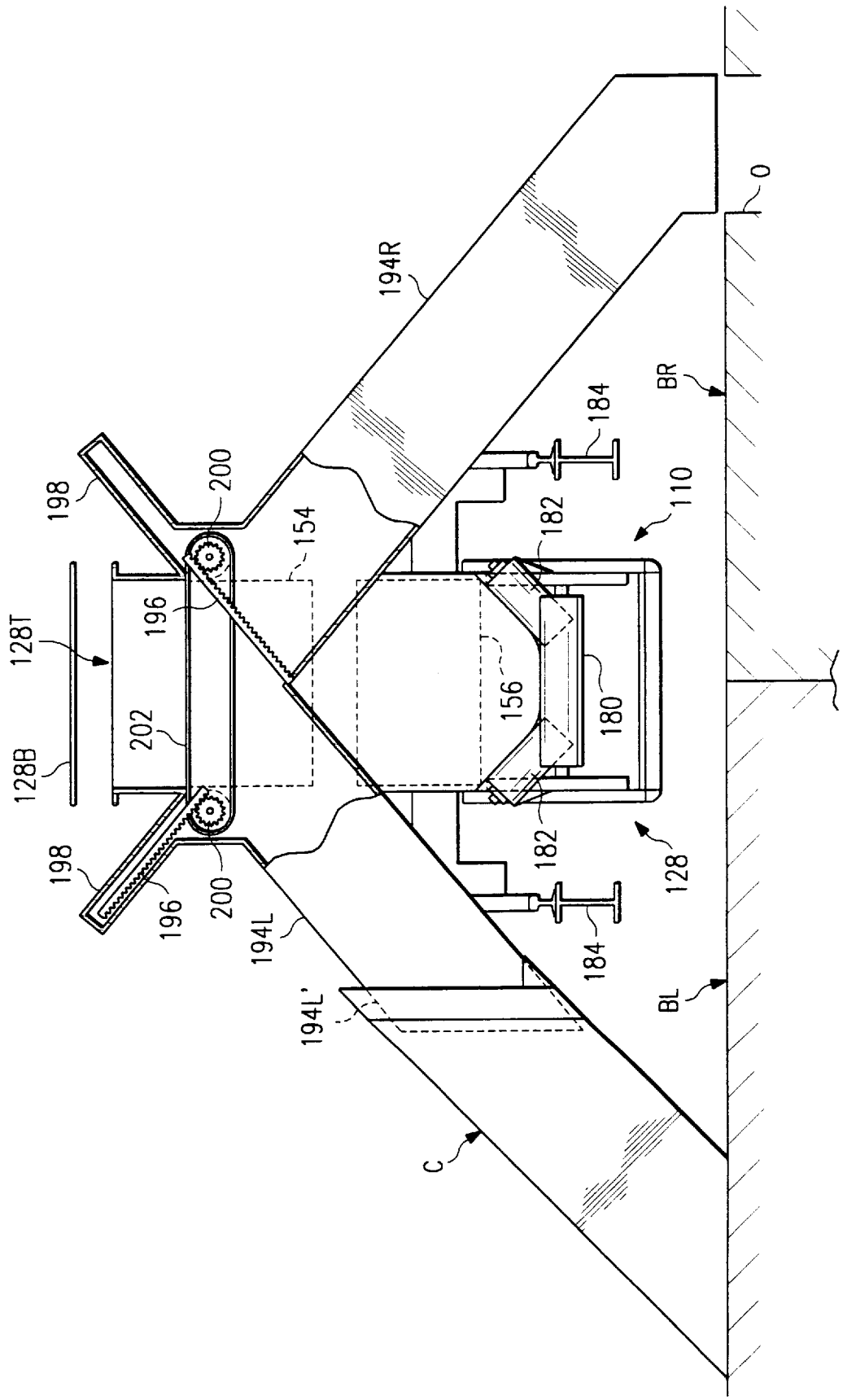
FIG. 7 is a schematic head end view of the movable tripper unit of the embodiment of FIG. 6.

The enclosed movable tripper belt conveyor shown in FIGS. 6 and 7 is the same in principle as the conveyor of FIGS. 1 to 5. Accordingly, the same reference numerals, but increased by 100, are used for corresponding components, and the following description deals only with the main differences.

Each of the troughing idlers 116, 150, 152 and 152' consists of a horizontal roller 180, the shaft of which is supported by bearings 180b mounted outside the side walls of the trunking sections 110S or the side walls (described below) of the movable tripper unit 140, and downwardly and inwardly sloping side rollers 182, which are mounted on spindles that are cantilevered from the side walls. Reference may be made to application Ser. No. 09/025,563 referred to above for descriptions and drawings of troughing idlers suitable for use in conveyors according to the present invention.

The trunking cover 128 for the movable tripper unit 140 consists of a cover 128M over the movable tripper unit that is fixed to the frame 146 that supports the components of the movable tripper unit and thus moves with the movable tripper unit and a flexible cover belt 128B. The cover 128M includes side wall panels 126M on each side, the lower edges of which are in sliding sealed relation with the upper edges of the side walls of the trunking 110, an inclined rear cover panel 124I, a top panel 124T and a front panel 124F. Tracks 184 running along the sides of the trunking 110 support the frame 146 for travel above the trunking 110 along the delivery section of the conveyor.

The flexible cover belt 128B rests in sealed relation on the top edges of the side walls of the trunking 110 throughout the entire length of the discharge section, i.e., the section along which the movable tripper unit 140 travels, except for the part of the discharge section occupied at any point in time by the movable tripper unit 140. Belt hold-down rolls 190R and 190F mounted on the frame 146 at opposite ends of the lower edges of the side wall panels 126M hold the cover belt 128B down on the upper edges of the side walls of the trunking 110 where the walls 126M intersect with the top edges of the side walls of the trunking 110. Turning rolls 192 mounted on the frame 146 lead the cover belt 128F over the top of the movable tripper unit. The cover belt 128B encloses the trunking 110 along all portions of the discharge section that are not occupied by the movable tripper unit 140. The cover 128M encloses the movable tripper unit 140 at the position it occupies, i.e., the region where the cover belt 128B is picked up and supported over the top the movable tripper unit.

Discharge chutes 194R and 194L are affixed to the side wall panels 126M and move with the movable tripper unit as it travels along the discharge section. FIG. 7 illustrates two possible arrangements of the discharge chutes. The chute 194R is configured to discharge material directly into an opening O in the top of a bin BR. The chute 194L has a movable telescopic extension 194L' that retracts when the movable tripper unit is moved and extends into the mouth of a chute C that leads to the bin BL for discharge. Each of the chutes 194R and 194L has a slide gate valve 196, each of which in the open position retracts into a pocket 198 attached to the side panel 126M of the frame 146. The slide gate valves are operated by rack and pinion drives 200 that are coupled by a chain 202 so that when one gate is moved to the closed position, the other gate is moved to an open position. One of the pinions of the drive is coupled by a shaft 204 having a drive sprocket 206, which is the output of a drive motor (not shown).

The dashed line M represents the trajectory of the material that is ejected from the conveyor belt 114 at the upper bend pulley 154. The material M impinges on a front wall shared by the two chutes 194R and 194L and is diverted to one side or the other by the slide gate valve that is closed at the time of discharge. The material is directed by the closed slide gate through the open slide gate and flows through the open chute (194L in the case shown in FIG. 7) into the bin BR or BL that it serves.

When the movable tripper unit 140 is moved from chute to chute, the unit makes its way under the cover belt 128B, which is diverted by the rolls 190 and 192 to follow a path clear of the top walls 126I, 126T and 126F of the cover 128M of the movable tripper unit. The cover belt 128B, the trunking 110, and the cover 128M of the movable tripper unit 140 form an enclosure for confining the material being conveyed by the enclosed movable tripper conveyor and protecting the material from the environment.

It is possible, though not preferred, to omit one or more of the inclined rear panel 126I, the top panel 126T and the front panel 126F from the cover 128M of the movable tripper unit 140 of FIGS. 6 and 7 and have the cover belt 128B sealed in sliding relation to the edges of the side walls 124M where a panel or panels of the cover 128M is omitted. The path of the belt over the top of the movable tripper unit can, of course, vary. In some cases, the valve of the movable tripper unit may be of a three-way type that provides for right, left and center delivery or pass-through delivery back to the belt as it leads from the lower belt pulley 156 of the movable tripper unit 140 for conveyance by the belt to a head end discharge.

What is claimed is:

1. An enclosed movable tripper belt conveyor comprising trunking having a floor, side walls, a tail end and a head end;

a tail pulley mounted in the tail end of the trunking;

a head pulley mounted in the head end of the trunking;

a plurality of longitudinally spaced-apart troughing idlers mounted on the side walls of the trunking along the entire length thereof between the tail pulley and the head pulley and defining an upper troughed path for an endless belt;

an endless belt received in the trunking and supported by the tail pulley and the head pulley and the troughing idlers for movement along portions of the upper path and movable along a return run from the head pulley to the tail pulley in sliding contact with a floor of the trunking;

a movable tripper unit having a tripper including a frame supported for movement longitudinally along a portion of the trunking and having side support members located above and laterally on both sides of the upper path of the belt and means carried by the frame for leading the belt from the upper path along an inclined path to a discharge unit, the discharge unit having an upper bend pulley and a valve configured and arranged to receive material from the belt adjacent the upper bend pulley and discharge it selectively to one side or the other of the movable tripper unit, and a lower bend pulley carried by the frame above the upper path and below the upper bend pulley, the belt leading from the lower bend pulley back to the upper path; and a cover received over the trunking and configured and arranged to form with the trunking an enclosure containing the belt, the tail pulley, the head pulley, all of the troughing idlers and the movable tripper unit.

2. An enclosed movable tripper belt conveyor according to claim 1 wherein the cover includes an inverted U-shaped rigid trunking cover coextensive with at least the portion of the trunking along which the movable tripper unit is movable, the trunking cover having a top wall and side walls, and the lower edges of side walls of the trunking cover being joined to the upper edges of the side walls of the trunking.

3. An enclosed movable tripper belt conveyor according to claim 1 wherein the cover of the trunking includes cover panels attached to the side walls of the trunking along at least a portion of the trunking between the tail end and the portion of the trunking along which the movable tripper unit is movable.

4. An enclosed movable tripper belt conveyor according to claim 2 and further comprising a plurality of longitudinally spaced-apart delivery chutes attached to each of the side walls of the trunking cover.

5. An enclosed movable tripper belt conveyor according to claim 4 wherein the valve of the movable tripper unit is a basket valve that is movable to communicate selectively with an inlet opening to a delivery chute on one side or the other of the trunking cover.

6. An enclosed movable tripper belt conveyor according to claim 4 wherein the tripper includes a pair of spaced-apart discs engaging the upper surface of the belt at a location between the upper path and the discharge unit, each disc engaging a band of the belt proximate to a juncture between a medial portion and an inclined side portion so as to maintain the side portions inclined with respect to the medial portion.

7. An enclosed movable tripper belt conveyor according to claim 6 wherein the tripper includes at least one troughing idler.

8. An enclosed movable tripper belt conveyor according to claim 1 wherein the frame of the movable tripper unit includes side walls on each side, the lower edges of which are in sliding and sealed relation with upper edge portions of the side walls of the trunking.

9. An enclosed movable tripper belt conveyor according to claim 8 wherein the trunking cover includes a flexible cover belt that engages the upper edges of the side walls of the trunking in a portion along which the movable tripper unit travels and that is guided up and over the movable tripper unit.

10. An enclosed movable tripper belt conveyor according to claim 9 wherein the frame of the movable tripper unit carries belt hold-down rolls mounted at opposite ends of the lower edges of the side walls so as to hold the cover belt down on the upper edges of the side walls of the trunking where the side walls of the frame meet the trunking side walls.

11. An enclosed movable tripper belt conveyor according to claim 9 wherein the movable tripper unit has a rigid trunking cover that includes front, top and rear walls joined to the side walls.

12. An enclosed movable tripper belt conveyor according to claim 11 wherein the frame of the movable tripper unit carries turning rolls that are located outwardly of corners where the rear, top and front walls intersect so as to guide the cover belt along paths that are clear of the corners.

13. An enclosed movable tripper belt conveyor according to claim 8 wherein discharge chutes are affixed to the side walls of the frame and move with the movable tripper unit as it travels along the discharge section.

14. An enclosed movable tripper belt conveyor according to claim 13 wherein each chute is configured to discharge material directly into an opening in the top of a bin.

15. An enclosed movable tripper belt conveyor according to claim 13 wherein each chute has a movable telescopic extension that retracts when the movable tripper unit is moved and extends into the mouth of a chute that leads to a bin for discharge.

16. An enclosed movable tripper belt conveyor according to claim 13 wherein each of the chutes has a slide gate valve which in the open position retracts into a pocket attached to one of the side walls of the frame.

17. An enclosed movable tripper belt conveyor according to claim 16 wherein the slide gate valves are operated by rack and pinion drives that are coupled so that when one gate is moved to the closed position, the other gate is moved to an open position.

18. An enclosed movable tripper belt conveyor according to claim 8 wherein the valve of the movable tripper unit includes discharge troughs having dual interlocked rack and pinion gates.

19. An enclosed movable tripper belt conveyor according to claim 8 wherein the movable tripper unit is supported by tracks outside of the trunking and extending along the delivery section of the conveyor.

20. An enclosed movable tripper belt conveyor according to claim 8 wherein the movable tripper unit includes a pair of spaced-apart discs engaging the upper surface of the belt at a location between the upper path and the discharge unit, each disc engaging a band of the belt proximate to a juncture between a medial portion and inclined side portions so as to maintain the side portions inclined with respect to the medial portion.

21. An enclosed movable tripper belt conveyor according to claim 8 wherein the movable tripper unit includes at least one troughing idler.

* * * * *